(12) United States Patent
Fujimoto (10) Patent No.: US 7,424,661 B2
(45) Date of Patent: Sep. 9, 2008

(54) PACKET TRANSMISSION SYSTEM IN WIRELESS LAN

(75) Inventor: Atsushi Fujimoto, Tokyo (JP)

(73) Assignee: Iwatsu Electric Company Ltd., Tokyo (JP)

( * ) Notice: Subject to any disclaimer, the term of this patent is extended or adjusted under 35 U.S.C. 154(b) by 518 days.

(21) Appl. No.: 11/179,678

(22) Filed: Jul. 13, 2005

(65) Prior Publication Data

US 2006/0013189 A1   Jan. 19, 2006

(30) Foreign Application Priority Data

| Jul. 14, 2004 | (JP) | ............................. 2004-207470 |
| Jun. 24, 2005 | (JP) | ............................. 2005-184404 |

(51) Int. Cl.
    *H04L 1/18* (2006.01)
(52) U.S. Cl. ...................................... 714/749; 714/776
(58) Field of Classification Search .................. 714/749, 714/776
    See application file for complete search history.

(56) References Cited

U.S. PATENT DOCUMENTS

| 4,901,313 | A  | * | 2/1990  | Fujikura et al.   | ............. 370/324 |
| 6,021,516 | A  | * | 2/2000  | Okajima et al.    | ............. 714/748 |
| 6,118,771 | A  | * | 9/2000  | Tajika et al.     | ............. 370/328 |
| 6,175,557 | B1 | * | 1/2001  | Diachina et al.   | ............. 370/313 |
| 6,341,145 | B1 | * | 1/2002  | Hioe et al.       | ................. 375/256 |
| 6,651,107 | B1 | * | 11/2003 | Conley et al.     | ............... 709/250 |
| 6,992,982 | B1 | * | 1/2006  | Meyer et al.      | ................. 370/231 |
| 6,996,083 | B1 | * | 2/2006  | Balachandran et al. | ...... 370/337 |
| 7,114,002 | B1 | * | 9/2006  | Okumura et al.    | ............ 709/232 |
| 2003/0099211 | A1 | * | 5/2003 | Moulsley et al.  | ............ 370/328 |
| 2004/0264507 | A1 | * | 12/2004 | Cho et al.       | .................... 370/480 |

OTHER PUBLICATIONS

"Part 11: Wireless LAN Medium Access Control (MAC) and Physical Layer (PHY) Specifications", IEEE Standard for Information Technology, ANSI/IEEE Std. 802.11, 1999 Edition, cover page, pp. xi-xvi and pp. 3-84.

* cited by examiner

*Primary Examiner*—Mujtaba K Chaudry
(74) *Attorney, Agent, or Firm*—Reed Smith LLP; Stanley P. Fisher, Esq.; Juan Carlos A. Marquez, Esq.

(57) ABSTRACT

A packet transmitting apparatus comprises a wireless LAN base station and wireless terminals connected to the wireless LAN base station through the wireless LAN. From the wireless LAN base station to the respective wireless terminals, data packets are transmitted in a signal form of frame burst packets without an ACK and a series of header information on the respective data packets are transmitted as notification packets in a signal form of multicast packets. Data packets are individually transmitted from each wireless terminal to the wireless LAN base station by unicast using ACK. Each wireless terminal transmits to the wireless LAN base station a retransmission request to retransmit an unreceived data packet among the frame packets notified by corresponding one of the notification packets. The wireless LAN base station retransmits the packet corresponding to the retransmission request to the wireless terminal that transmits the retransmission request by unicast using ACK.

25 Claims, 7 Drawing Sheets

■ : Beacon
▯ : Notification Packet
▦ : ACK (MAC)

PACKET TRANSMISSION SYSTEM IN WIRELESS LAN

BACKGROUND OF THE INVENTION

1. Field of the Invention

The present invention relates to a wireless local area network (LAN). More specifically, the present invention relates to a packet transmission system in a wireless LAN.

2. Description of the Related Art

The LAN was initially developed and used as a wired network. However, following an incessant pursuit for speed-up and cost reduction of a wireless LAN as well as a development of mobile computing and mobile terminal techniques in recent years, the use of the wireless LAN configured by substituting at least a part of the wired network with a wireless network has gradually spread.

As Internet Protocol telephone (IP telephone or IPT) has spread, a voice is becoming one of important applications even in the field of the wireless LAN and cooperation of the voice application with the other applications is becoming important (see Non-Patent Literature 1).

Non-Patent Literature 1: IEEE 802.11 Standards

For an ordinary wireless LAN system according to the currently most popular IEEE802.11 Standards, however, a maximum number of simultaneous calls is only about six. The ordinary wireless LAN system cannot ensure, therefore, a sufficient number of simultaneous calls for a wireless telephone system.

The reason is as follows. In the wireless LAN at a transmission rate of 11 Mbps using a 2.4 GHz band according to the currently most popular IEEE 802.11 Standards, overhead during a packet transmission time is larger in amount, resulting in quite low transmission efficiency in transmitting a packet having a small data length such as a voice packet.

Meanwhile, a magnitude of the overhead of the packet transmission does not depend on a packet period. It is, therefore, possible to reduce an overhead ratio, improve the voice transmission efficiency, and increase the maximum number of simultaneous calls by setting the packet period longer. The longer packet period, however, causes call quality-related disadvantages including not only an increase in a delay in voice transmission but also a considerable degradation in call quality when a packet loss occurs.

SUMMARY OF THE INVENTION

The present invention has been achieved to solve the conventional disadvantages. It is, therefore, an object of the present invention to provide a method and an apparatus for packet transmission in a wireless LAN capable of increasing a maximum number of simultaneous calls without degrading a call quality of voice transmission.

A cellular IP telephone expected to become a mainstream in the future performs a power saving operation even during a call so as to secure a good battery performance. Meanwhile, in the ordinary wireless LAN according to the IEEE 802.11 Standards, a packet is generated for the power saving operation. As a result, the maximum number of simultaneous calls of the ordinary wireless LAN disadvantageously further decreases to about 70 percent. In the wireless LAN according to the present invention, even if a power saving operation is carried out during a call, a decrease in the maximum number of simultaneous calls due to this power saving operation does not occur. It is, therefore, possible to realize a wireless LAN system applicable to a cellular IP telephone system having strict battery-related requirements.

According to a first aspect of the present invention, there is provided a packet transmitting method in a wireless LAN for a packet transmitting apparatus comprising a wireless LAN base station; and a plurality of wireless terminals connected to the wireless LAN base station through the wireless LAN, the method comprising steps of:

transmitting a plurality of data packets corresponding to each of the plurality of wireless terminals from the wireless LAN base station to the plurality of wireless terminals in a signal form of frame burst packets without an acknowledgement (ACK), and transmitting a series of header information included in the plurality of data packets transmitted in the signal form of the frame burst packets, as notification packets, from the wireless LAN base station to the plurality of wireless terminals in the signal form of multicast, respectively;

sequentially transmitting data packets of each of the plurality of wireless terminals from each of the plurality of wireless terminals to the wireless LAN base station in the signal form of unicast using ACK;

causing each of the plurality of wireless terminals to receive the data packets and the notification packets, respectively corresponding to each of the plurality of the wireless terminals, transmitted in the signal form of the frame burst packets without ACK, and, if an unreceived packet is detected among the frame packets destined to the each wireless terminal and notified by the notification packet, causing each of the plurality of wireless terminals to transmit retransmission request information from the wireless terminal to the wireless LAN base station for requesting retransmission of the unreceived packet by adding a retransmission header;

causing the wireless LAN base station to retransmit a packet corresponding to the retransmission request information to the each wireless terminal that transmits the retransmission request information in the signal form of unicast with an ordinary ACK when the wireless LAN base station receives the retransmission request information; and causing the each wireless terminal that transmits the retransmission request information to receive the retransmitted packet from the wireless LAN base station.

The plurality of data packets corresponding to the respective plurality of wireless terminals can be transmitted from the wireless LAN base station to the plurality of wireless terminals as a single sequence in the signal form of the frame burst packets without ACK and in the signal form of multicast.

According to a second aspect of the present invention, there is provided a wireless LAN base station apparatus for carrying out said packet transmitting method in the wireless LAN, the apparatus comprising:

frame burst transmission means without an ACK for continuously transmitting a plurality of data packets destined to a plurality of wireless terminals at minimum frame intervals without using ACK;

retransmission processing means for performing a processing for transmitting a data packet to be retransmitted based on retransmission request information included in data packets transmitted from the plurality of wireless terminals;

notification packet generation means for generating notification packets for notifying the plurality of wireless terminals of frame burst structure information on frame burst packets that are all the data packets continuously transmitted at the minimum frame intervals without using an ACK packet between beacons; and frame transmission means with ACK for transmitting the data packets to be retransmitted with the notification packets according to retransmission control procedures using a predetermined frame interval and an ACK packet.

According to a third aspect of the present invention, there is provided a wireless terminal for carrying out the packet transmitting method in the wireless LAN, the wireless terminal comprising:

retransmission request processing means for generating retransmission request information if an unreceived packet is detected among frame burst packets destined to the wireless terminal and notified by frame structure information included in a notification packet transmitted to the wireless terminal;

retransmission header adding means for transmitting the retransmission request information generated by the retransmission request processing means with a retransmission header accompanied with the data packets destined to the wireless LAN base station; and retransmitted packet receiving means for receiving the retransmitted data packet.

According to a fourth aspect of the present invention, there is provided a packet transmitting apparatus in a wireless LAN comprising a wireless LAN base station; and a wireless terminal connected to the wireless LAN base station through the wireless LAN, wherein the wireless LAN base station includes:

frame burst transmission means without an ACK for continuously transmitting a plurality of data packets destined to a plurality of the wireless terminals at minimum frame intervals without ACK;

retransmission processing means for performing a processing for transmitting a data packet to be retransmitted based on retransmission request information included in data packets transmitted from the plurality of wireless terminals;

notification packet generation means for generating notification packets for notifying the plurality of wireless terminals of frame burst structure information on frame burst packets that are all the data packets continuously transmitted at the minimum frame intervals without using an ACK packet between beacons; and frame transmission means with ACK for transmitting the data packet to be retransmitted according to retransmission control procedures using a predetermined frame interval and an ACK packet, and the each wireless terminal includes:

retransmission request processing means for generating the retransmission request information if an unreceived packet is detected among frame burst packets destined to the wireless terminal and notified by frame structure information included in the notification packet transmitted to the wireless terminal;

retransmission header adding means for transmitting the retransmission request information generated by the retransmission request processing means with a retransmission header accompanied with the data packets destined to the wireless LAN base station; and retransmitted packet receiving means for receiving the retransmitted data packet.

The frame burst transmission means without ACK included in the wireless LAN base station may include sequence number allocating means for allocating a sequence number to each of the data packets transmitted using a frame burst, the retransmission request processing means included in the each wireless terminal may generate the retransmission request information including the sequence number, and the retransmission processing means included in the wireless LAN base station may perform a retransmission processing while referring to the sequence number included in the retransmission request information accompanied with the data packets transmitted from the wireless terminal.

Further, the wireless terminal may include frame burst request packet generation means for requesting the wireless LAN base station in advance to transmit the data packets destined to the wireless terminal using a frame burst, the wireless LAN base station may include a frame burst response packet generation means for notifying the wireless terminal whether the frame burst is applied to transmission of the data packets destined to the wireless terminal if the wireless LAN base station receives the frame burst request packet, the frame burst transmission means included in the wireless LAN base station may transmit only the data packets destined to the wireless terminal using the frame burst for which it is notified that the frame burst is applied, and may transmit the other data packets destined to the wireless terminal with ACK and without using the frame burst, and the retransmission request processing means included in the wireless terminal may transmit the retransmission request information accompanied with the data packets only when the wireless terminal receives the frame burst response packet that notifies the wireless terminal that the frame burst is applied to the transmission of the data packets destined to the wireless terminal, and may transmit the data packets without adding the retransmission request information when receiving the frame burst response packet that notifies the wireless terminal that the frame burst is not applied.

Moreover, the frame burst transmission means included in the wireless LAN base station may transmit only the data packets having a predetermined priority using the frame burst, and may transmit the data packets having priority other than the predetermined priority with ACK and without using the frame burst, and the retransmission request processing means included in the wireless terminal may transmit only the data packets having the predetermined priority while having the retransmission request information added to the data packet, and may transmit the data packets having the priorities other than the predetermined priority without having the retransmission request information added to the data packets.

When the wireless terminal transmits the retransmission request information accompanied with the data packets destined to the wireless LAN base station if the wireless terminal operates in a power saving mode even during a call, the wireless LAN base station may be notified that a power saving mode is changed to an active mode by header information on the transmitted data packet if the accompanied retransmission request information requests to retransmit the data packet received using the frame burst, and the wireless LAN base station may be notified that the power saving mode is changed to a sleep mode by the header information on the transmitted data packet if the accompanied retransmission request information does not request to retransmit the data packet received using the frame burst.

In the wireless LAN according to the present invention, the wireless LAN base station continuously transmits the packets destined to the respective wireless terminals at the minimum frame intervals without ACK, and performs the retransmission processing using the data packet destined to the wireless LAN base station from each of the wireless terminals. The efficiency in data packet transmission is thereby improved, and the maximum number of simultaneous calls thereby considerably increases particularly in a VoIP system using the wireless LAN.

Since the maximum number of simultaneous calls increases without lengthening the packet period in the wireless LAN according to the present invention, the call quality is not degraded. In addition, even if the power saving operation is performed during a call, the maximum number of simultaneous calls does not decrease. It is, therefore, possible to construct the VoIP system by the high quality wireless LAN.

DESCRIPTION OF THE PREFERRED EMBODIMENT

One embodiment of the present invention will be described hereinafter in detail with reference to the drawings.

Figure 1:
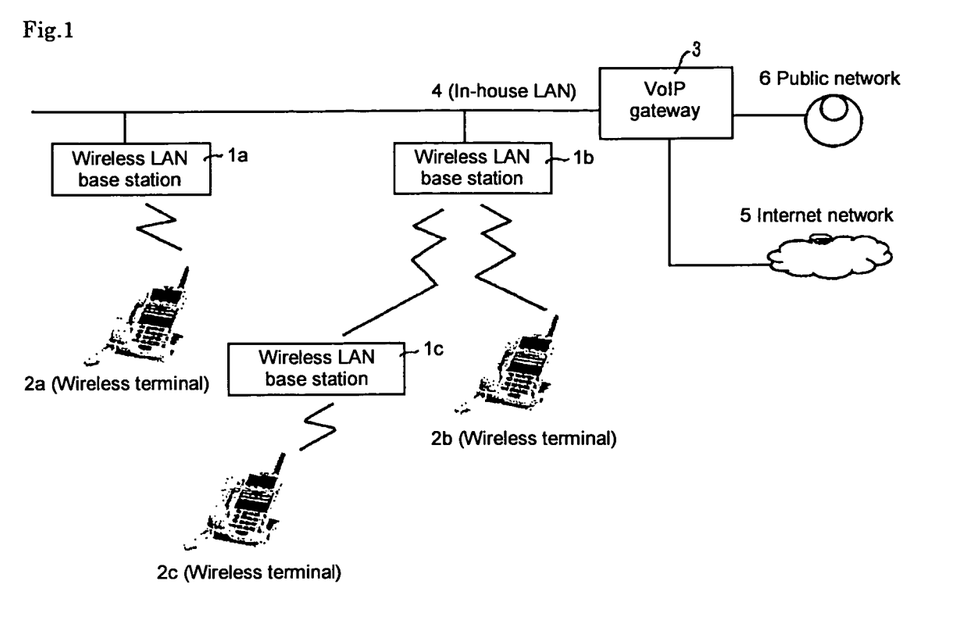
FIG. 1 is a block diagram that depicts an example of an overall configuration of a wireless LAN apparatus according to one embodiment of the present invention.

FIG. 1 is a block diagram that depicts an example of an overall configuration of a wireless LAN system according to one embodiment of the present invention.

A wireless LAN system shown in FIG. 1 is composed by a plurality of wireless LAN base stations 1a, 1b, etc., a plurality of wireless telephones (wireless terminals) 2a, 2b, etc. connected to the wireless LAN base stations 1a, 1b, . . . through a wireless LAN, and a VoIP gateway 3 that executes a call control over the wireless telephones 2a, 2b, . . . . The VoIP gateway 3 includes an interface with an Internet network 5 and a public network 6. Each of the wireless LAN base stations 1a, 1b, . . . may be connected to the VoIP gateway 3 through an in-house wired LAN 4 or through the wireless LAN for a communication with the other wireless LAN base station.

Figure 2:
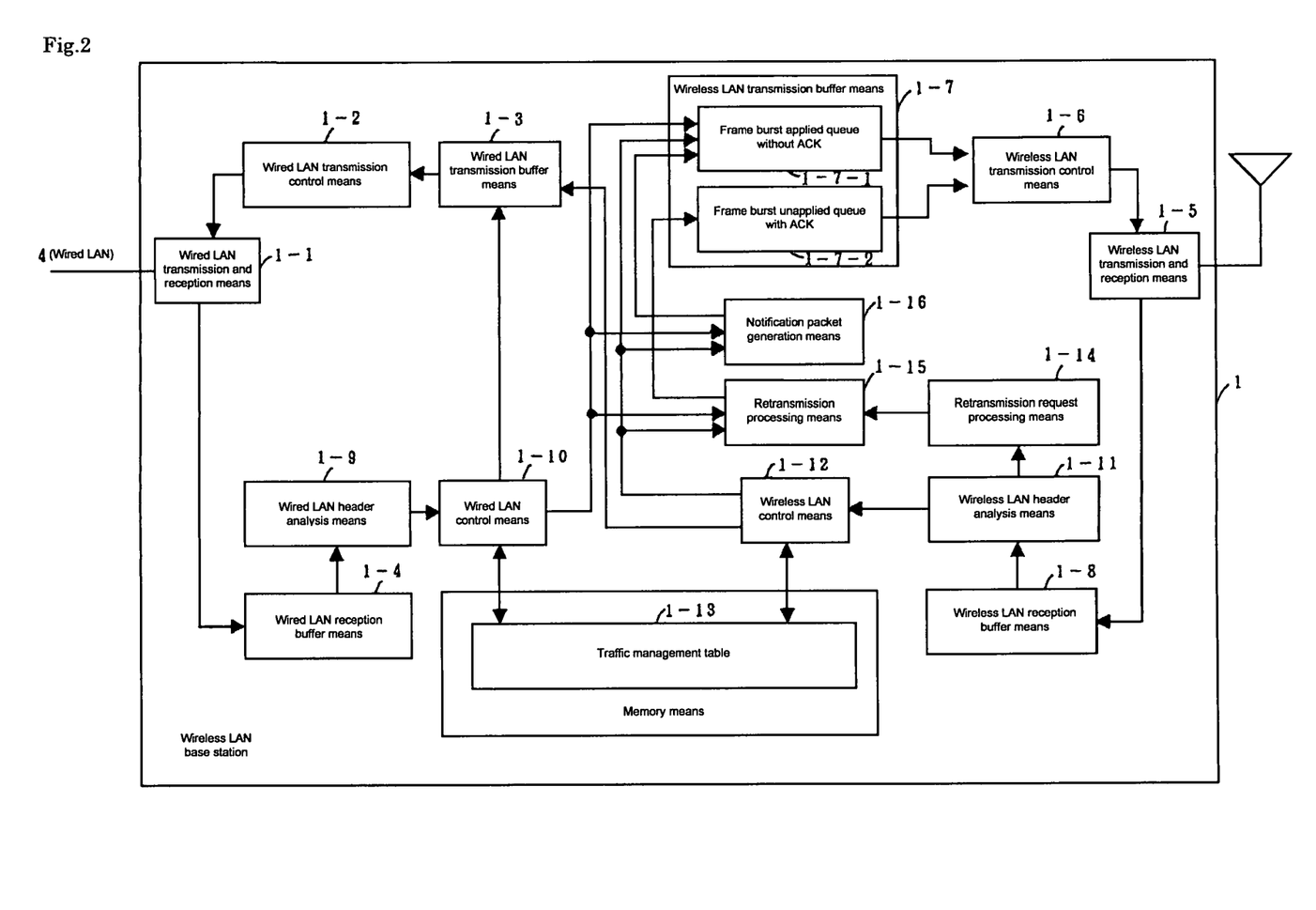
FIG. 2 is a block diagram that depicts an example of a configuration of a wireless LAN base station according to the present invention.
Figure 3:
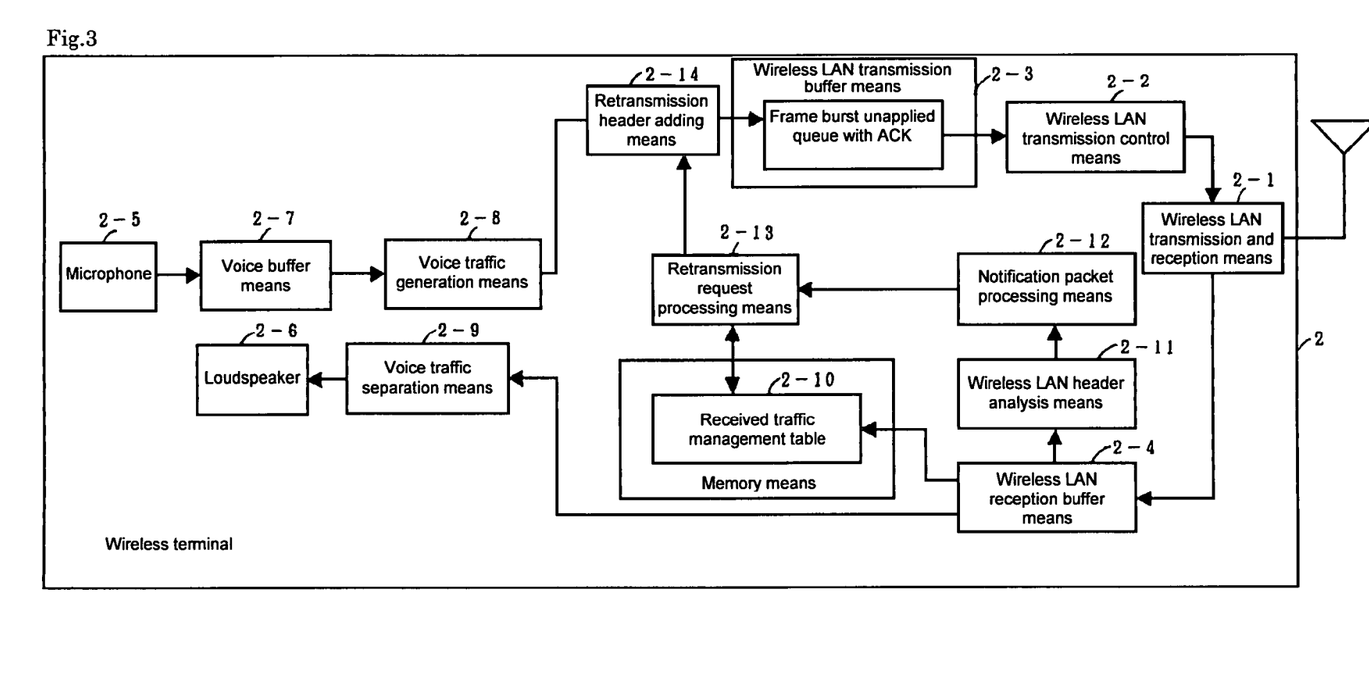
FIG. 3 is a block diagram that depicts an example of a configuration of a wireless terminal according to the present invention.

Referring to FIGS. 2 and 3, more detailed configurations of the wireless LAN base station and the wireless terminal will next be described. FIG. 2 is a block diagram that depicts one example of the configuration of the wireless base station according to the present invention.

As shown in FIG. 2, the wireless LAN base station 1 (note, reference symbol 1 generically represents each of the wireless LAN base stations 1a, 1b, etc.) includes, for transmission and reception operations in the wired LAN 4, a wired LAN transmission and reception means 1-1, a wired LAN transmission control means 1-2, a wired LAN transmission buffer means 1-3, and a wired LAN reception buffer means 1-4. The wireless LAN base station 1 also includes, for transmission and reception operations in the wireless LAN, a wireless LAN transmission and reception means 1-5, a wireless LAN transmission control means 1-6, a wireless LAN transmission buffer means 1-7, and a wireless LAN reception buffer means 1-8.

The wireless LAN transmission buffer means 1-7 includes both a frame burst applied queue without ACK 1-7-1 that is not controlled for retransmission using an ACK and that continuously executes frame transmissions at minimum frame intervals, and a frame burst unapplied queue with ACK 1-7-2 that is controlled for retransmission using ACK and that executes transmissions at predetermined frame intervals.

The wireless LAN base station 1 according to the present invention further includes a wired LAN header analysis means 1-9, a wired LAN control means 1-10 that performs a bridge processing in response to a result of a wired LAN header analysis, a wireless LAN header analysis means 1-11, a wireless LAN control means 1-12 that performs a bridge processing in response to a result of a wireless LAN header analysis, and a traffic management table 1-13 including information on terminals communicating with the wireless LAN base station 1 and the like.

The wireless LAN base station 1 does not execute a retransmission control using ACK over data packet transmission to each wireless terminal. The wireless LAN base station 1 uses retransmission request information accompanied with each data packet transmitted from the wireless terminal in place of the ACK packet. Namely, the wireless LAN base station 1 analyzes the retransmission request information, and retransmits the data packet only when a retransmission request is present.

To do so, the wireless LAN header analysis means 1-11 fetches the retransmission request information, and a retransmission request processing means 1-14 analyzes a content of the retransmission request information.

Further, the wireless LAN base station 1 does not execute the retransmission control using ACK over data traffic transferred from the wired LAN control means 1-10 or the wireless LAN control means 1-12 to the wireless LAN transmission buffer means 1-7, but stores the data traffic in the frame burst applied queue without ACK 1-7-1 that continuously executes frame transmissions at minimum frame intervals. Further, the data traffic transferred to the wireless LAN transmission buffer means 1-7 is fed to a retransmission processing means 1-15 and a notification packet generation means 1-16 as well.

The retransmission processing means 1-15 executes a retransmission control using ACK over data traffic that needs the retransmission request based on the retransmission request information output from the retransmission request processing means 1-14. In addition, the retransmission processing means 1-15 stores the data traffic in the frame burst unapplied queue with ACK 1-7-2 that executes transmissions at predetermined frame intervals. Due to this, when retransmission target data packets are transmitted, the retransmission control using an ACK packet is executed, so that the retransmission target data packets can be transmitted to the respective wireless terminals at a high success probability.

The notification packet generation means 1-16 acquires information (header information such as a MAC address and a sequence number) on the data packet transmitted to each wireless terminal in the form of a frame burst packet between beacons, and notifies each of a plurality of wireless terminals of this information (hereinafter, "notification packet") by broadcast or multicast.

Referring to FIG. 3, the detailed configuration of the wireless terminal (note, reference symbol 2 generically represents each of the wireless terminals 2a, 2b, etc.) will next be described.

FIG. 3 is a block diagram that depicts an example of the configuration of the wireless terminal according to the present invention.

As shown in FIG. 3, the wireless terminal 2 according to the present invention includes, for performing transmission and reception operations in the wireless LAN, a wireless LAN transmission and reception means 2-1, a wireless LAN transmission control means 2-2, a wireless LAN transmission buffer means 2-3, and a wireless LAN reception buffer means 2-4.

The wireless LAN transmission buffer means 2-3 in the wireless terminal 2 executes a retransmission control using the ACK packet. It is noted, however, that the wireless terminal 2 executes frame transmissions at predetermined frame intervals without using a frame burst. The data packet is, therefore, transmitted from the wireless terminal 2 to the wireless LAN base station 1 at a high success probability thanks to a retransmission processing using the ACK packet.

Further, the wireless terminal 2 includes a microphone 2-5 and a loudspeaker 2-6 so that the wireless terminal 2 functions as a voice terminal. The wireless terminal 2, which functions as the wireless voice terminal, includes a voice buffer means 2-7, a voice traffic generation means 2-8, and a voice traffic separation means 2-9 for transmitting and receiving voice traffic.

In the wireless terminal 2 according to the present invention, the received data packet output from the wireless LAN reception buffer means 2-4 is fed to the voice traffic separation means 2-9. In addition, information on the received data packet is held in a received traffic management table 2-10.

If a wireless LAN header analysis means 2-11 detects a notification packet, a notification packet processing means 2-12 acquires information on packets transmitted from the wireless LAN base station 1 to all the wireless terminals 2. A retransmission request processing means 2-13 determines whether or not it is necessary to retransmit the data packet while referring to the information held in the received traffic management table 2-10, and notifies a retransmission header adding means 2-14 of a determination result.

The retransmission header adding means 2-14 adds retransmission request information as to whether or not a retransmission request is present, to a header of the data packet to be transmitted from the wireless terminal 2, and outputs the resultant data packet to the wireless LAN transmission buffer means 2-3.

Figure 4:
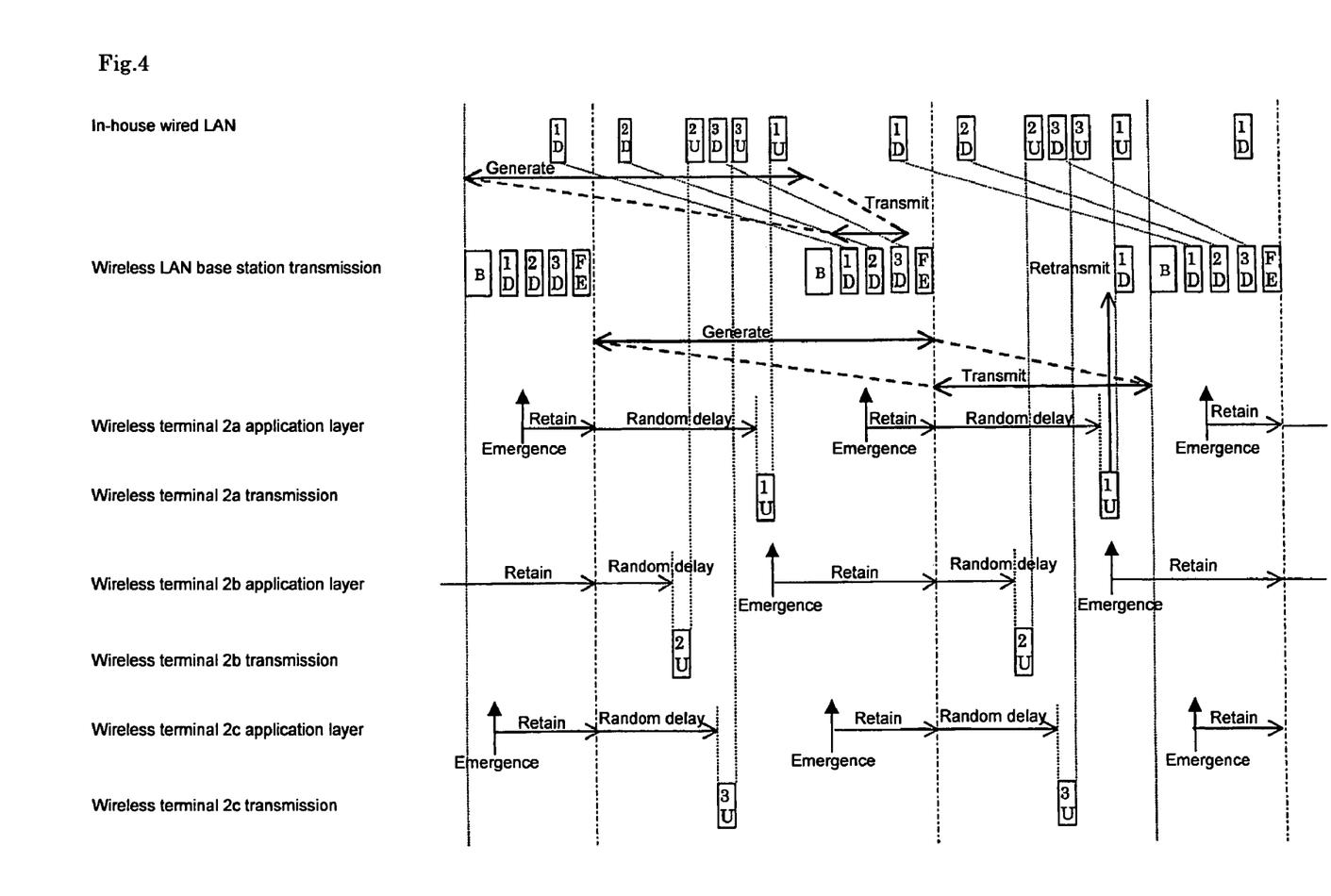
FIG. 4 is a time chart that explains a data packet transmission operation in a wireless LAN according to the present invention.

Referring to FIG. 4, a voice data packet transmission operation in the wireless LAN according to the present invention will next be described. FIG. 4 is a time chart that explains an example of the voice data packet transmission operation in the wireless LAN according to the present invention.

In FIG. 4, symbol "B" denotes a beacon in the wireless LAN. Symbol "ND" (where N is a number from 1 to 3) denotes voice data traffic transmitted from the wireless LAN base station 1 to the wireless terminal 2-N. Symbol "NU" (where N is a number from 1 to 3) denotes voice data traffic transmitted from the wireless terminal 2-N to the wireless LAN base station 1. Symbol "N" denotes a number allocated so as to discriminately indicate each call.

The wireless LAN base station 1 performs a bridge operation between a wireless transmission line and a wired transmission line with regard to the voice data traffic. The detailed bridge operation will next be described. A voice data packet from an in-house wired LAN 4 received by a wired LAN transmission and reception means 1-1 is stored in a wired LAN reception buffer means 1-4. A wired LAN control means 1-10 determines whether the traffic is destined to a wireless terminal 2 belonging to the corresponding base station, referring to address information detected by a wired LAN header analysis means 1-9 and a table of wireless terminals 2 belonging to the corresponding base station stored in a traffic management table 1-13. The wired LAN control means 1-10 stores the traffic in a wireless LAN transmission buffer means 1-7, if the traffic is destined to one of the wireless terminals 2 belonging to the corresponding base station. A voice data traffic is stored in a frame burst applied queue without ACK 1-7-1 of the wireless LAN transmission buffer means 1-7 and transmitted as a single burst continuously following a beacon with a beacon period through a wireless LAN transmission control means 1-6 and a wireless LAN transmission and reception means 1-5. In FIG. 4, the beacon period is assumed to be equal to a period of the voice data packet. The data packets destined to the wireless terminals 2-1, 2-2, 2-3 and so on are transmitted at intervals of short inter-frame space (SIFS) in FIG. 4.

Meanwhile, a voice data packet from a wireless terminal 2 received by a wireless LAN transmission and reception means 1-5 through the wireless LAN is stored in a wireless LAN reception buffer means 1-8. A wireless LAN control means 1-12 stores the traffic in a wired LAN transmission buffer means 1-3, if the traffic is not destined to one of the wireless terminals 2 belonging to the corresponding base station, referring to address information detected by a wireless LAN header analysis means 1-11 and a table of wireless terminals 2 belonging to the corresponding base station stored in a traffic management table 1-13. The traffic stored in the wired LAN transmission buffer means 1-3 is transmitted onto an in-house wired LAN 4 through a wired LAN transmission control means 1-2 and a wired LAN transmission and reception means 1-1.

Meanwhile, information on the voice data traffic acquired by the wired LAN control means 1-10 is also fed to a notification packet generation means 1-16 and a retransmission processing means 1-15, and is used for generating a notification packet and a retransmission packet respectively.

The notification packet generation means 1-16 generates a notification packet for informing all the wireless terminals 2 of information of all the data packets such as MAC addresses and sequence numbers transmitted during a frame burst period, and stores them in the wireless LAN transmission buffer means. In FIG. 4, each notification packet is denoted by symbol FE.

In the example shown in FIG. 4, a notification packet is stored in the frame burst applied queue without ACK 1-7-1 and transmitted at intervals of SIFS continuously following the voice data traffic.

The notification packets are transmitted to all the wireless terminals 2 by multicast or broadcast. A plurality of notification packets having same contents may be generated in advance and transmitted in order to improve a reliability of the notification packets.

In the meantime, retransmission request information is accompanied with the voice data traffic to be transmitted from the wireless terminals 2-N to the wireless LAN base station 1. A retransmission request processing means 1-14 analyzes the retransmission request information including MAC addresses, sequence numbers and so on, and notifies a retransmission processing means 1-15 of the result of the analysis. The retransmission processing means 1-15 stores the retained traffic of the MAC address and the sequence number in the frame burst unapplied queue with ACK 1-7-2, if the retransmission processing means 1-15 receives a retransmission request. The retransmission packet is transmitted onto the wireless LAN through a wireless LAN transmission control means 1-6 and a wireless LAN transmission and reception means 1-5. The retransmission packet is transmitted with ACK. Retransmission control is thus performed by the wireless LAN transmission control means 1-6, which improves a reliability of the entire transmission system.

In the example shown in FIG. 4, each wireless terminal 2 retains the voice data traffic emerging from a microphone 2-5 of the wireless terminal 2 itself in a voice buffer means, until receiving a next notification packet, and then transmits the data traffic as a data packet onto the wireless transmission line after giving a random delay to the data traffic by a voice traffic generation means 2-8, a retransmission header adding means 2-14 and a wireless LAN transmission control means 2-2.

Referring to an immediately before notification packet, retransmission request information determined by a wireless LAN header analysis means 2-11 and a notification packet processing means 2-12 is added to the header of this voice data packet by a retransmission request processing means 2-13 and a retransmission header adding means 2-14.

By the notification packet, for example, such information as MAC addresses and sequence numbers on all the packets transmitted during a frame burst period can be notified. A sequence number can be used to discriminate a plurality of packets transmitted, for example, to one wireless terminal 2 in one frame burst due to delay distortion on the network.

The wireless terminal 2 verifies whether all the packets destined to itself are received based on information notified by notification packets detected by the wireless LAN header analysis means 2-11, and add a retransmission request information to a header of the received data packet by the retransmission header adding means 2-14 using the retransmission request processing means 2-13, if an unreceived packet is detected.

When receiving a voice data packet, the wireless LAN base station 1 acquires retransmission request information included in the header of the voice data packet by a wireless LAN header analysis means 1-11, and if retransmission is requested, the wireless LAN base station 1 retransmits the data retained in a wireless LAN reception buffer means 1-8 to a corresponding wireless terminal 2. Transmission is performed by using ACK packet in this retransmission. The wireless LAN base station 1 receives the ACK packet, otherwise it repeats retransmitting the voice data packet up to a preset number of times, resulting in a high reliability of the retransmitting operation based on retransmission request to the extent that it is not necessary to add other steps any more.

Figure 5:
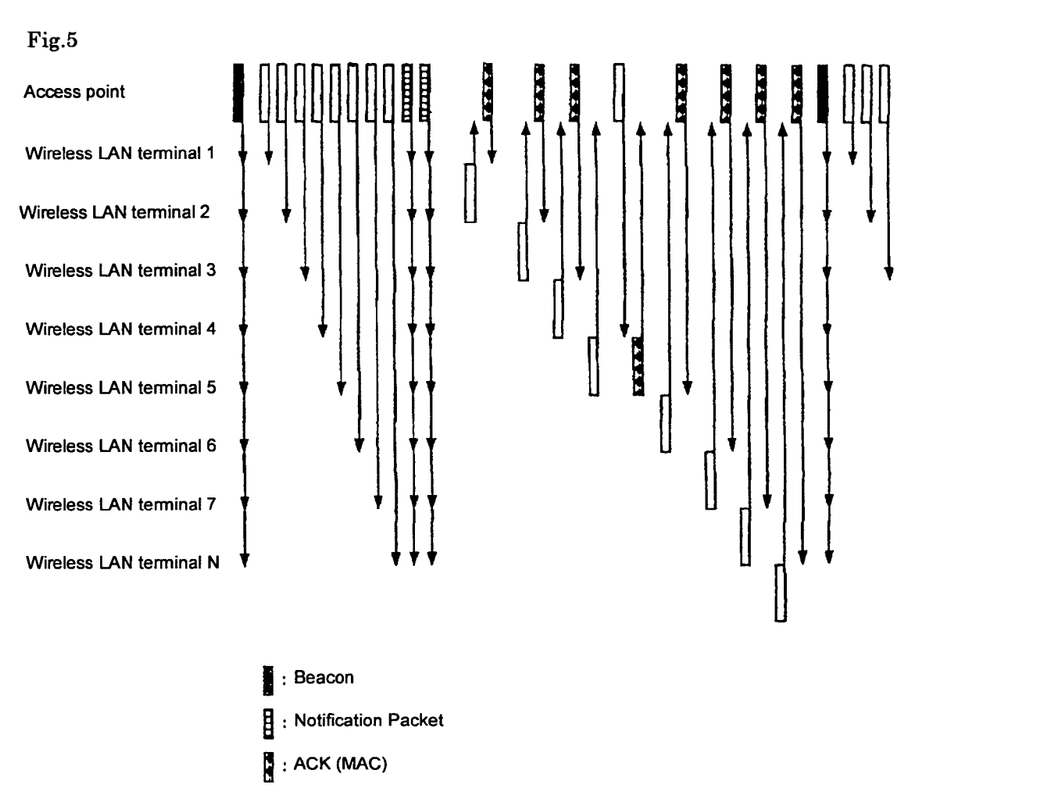
FIG. 5 is a time chart that explains more understandably the data packet transmission operation in the wireless LAN according to the present invention.

FIG. 5 is a time chart that more understandably explains the voice packet transmission operation in the wireless LAN according to the present invention. Operation conditions in the example shown in FIG. 5 are as follows.

(1) A beacon period is equal to a period of a VoIP packet.
(2) After a point inter-frame space (PIFS) of the beacon, down VoIP packets from an access point (AP) to the respective wireless terminals (hereinafter, simply "down VoIP packet") are transmitted as a single sequence. Namely, if a plurality of down VoIP packets are transmitted, only a leading packet acquires a transmission right and subsequent packets are transmitted after each SIFS at which each previous packet has been transmitted. If a down VoIP packet transmission time exceeds an upper limit (4 ms) of a physical medium occupation time, the sequence is temporarily stopped and remaining down VoIP packets are transmitted after a DIFS as a single sequence.
(3) The down VoIP packets are transmitted by, for example, multicast, since the down VoIP packets are transmitted without ACK. A unique expansion area (hereinafter, "unique header") is provided in each down VoIP packet, and a sequence number for a retransmission control is stored in the unique header. A packet including the unique header will be referred to as "unique packet", hereinafter.
(4) After transmission of the down VoIP packets, a notification packet is transmitted from the AP in the same sequence. If it is difficult to transmit the notification packet in the same sequence because of a processing timing, the notification packet may be transmitted in a sequence other than the down VoIP packets. Further, the notification packet may be transmitted by ordinary unicast using AN ACK. By transmitting the notification packet, information on all the down VoIP packets transmitted in the signal form of frame burst after the beacon is notified.
(5) Notification packets are transmitted by multicast. To improve a reliability of notification packet transmission, the same notification packet may be transmitted a plurality of number of times.
(6) Each wireless LAN terminal transmits an up VoIP packet after receiving the notification packet. The up VoIP packet is transmitted by unicast.
(7) A unique header is provided in the up VoIP packet, and information for a retransmission control over the down VoIP packet is stored in the unique header.
(8) When receiving the up VoIP packet, the AP analyzes the unique header of the up VoIP packet. If the retransmission request is included, the AP retransmits the down VoIP packet to the wireless LAN terminal. The down VoIP packet to be retransmitted (hereinafter, "retransmitted down VoIP packet") is transmitted by unicast.
(9) A unique header is provided in the retransmitted down VoIP packet, and sequence number information is stored in the unique header. Each wireless LAN terminal can correct a changing order of a plurality of VoIP packets received in one beacon period based on this sequence number information.

An improvement in the maximum number of simultaneous calls in the wireless LAN according to the present invention will be described with reference to FIGS. 6, 7, and 8 as well as Table 1.

Figure 6:
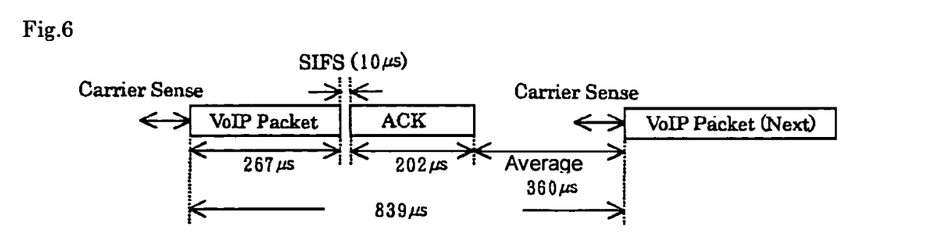
FIG. 6 is a time chart that depicts a medium occupation time of one packet sequence in voice packet transmission in a presently available standard wireless LAN.

FIG. 6 is a time chart that depicts a medium occupation time of one packet sequence if a voice packet is transmitted in a presently available standard wireless LAN.

Numeric values that represent respective times shown in FIG. 6 are given on the assumption that a voice codec is G.711 and a voice packet period is 20 ms. In addition, it is assumed that a wireless transmission rate is 11 Mbps and a short preamble having a good transmission efficiency is used for the voice packet. A long preamble is used for the ACK packet so as to match to a presently available product.

A time length of a voice packet sequence is 839 μs, a time length of the voice packet included in the voice packet sequence is 267 μs, and a net voice data transmission time is 116 μs. Namely, in this example, the transmission efficiency is about 14%.

If so, the maximum number of simultaneous calls is 11 as represented by the following Equation (1). It is assumed herein that a time length of the beacon is 1 ms.

$$(20\ ms-1\ ms)/839\ \mu s/2=11.3 \tag{1}$$

Figure 7:
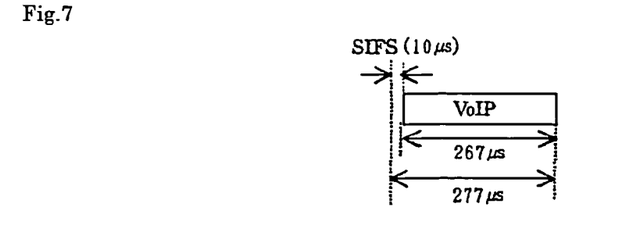
FIG. 7 is a time chart that depicts a medium occupation time of a voice packet sequence transmitted from a wireless base station to a wireless terminal in the wireless LAN according to the present invention.

FIG. 7 is a time chart that depicts a medium occupation time of a voice packet sequence transmitted from the wireless LAN base station 1 to the wireless terminal 2 in the wireless LAN according to the present invention.

Similarly to FIG. 6, numeric values that represent respective times shown in FIG. 7 are given on the assumption that the voice codec is G.711 and that the voice packet period is 20 ms. In addition, it is assumed that a wireless transmission rate is 11 Mbps and a short preamble having a good transmission efficiency is used for the voice packet.

A time length of a voice packet sequence is 277 µs, a time length of the voice packet included in the voice packet sequence is 267 µs, and a net voice data transmission time is 116 µs. Namely, in this example, the transmission efficiency is about 42%.

Figure 8:
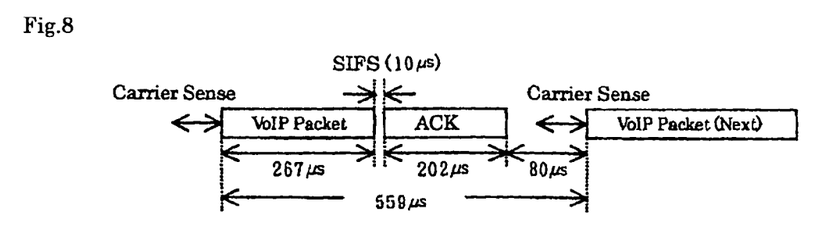
FIG. 8 is a time chart that depicts a medium occupation time of a voice packet sequence transmitted from the wireless terminal to the wireless base station in the wireless LAN according to the present invention.

FIG. 8 is a time chart that depicts a medium occupation time of a voice packet sequence transmitted from the wireless terminal 2 to the wireless LAN base station 1 in the wireless LAN according to the present invention.

Similarly to FIGS. 6 and 7, numeric values that represent respective times shown in FIG. 8 are given on the assumption that the voice codec is G.711 and that the voice packet period is 20 ms. In addition, it is assumed that a wireless transmission rate is 11 Mbps and a short preamble having a good transmission efficiency is used for the voice packet.

A time length of a voice packet sequence is 559 µs, a time length of the voice packet included in the voice packet sequence is 267 µs, and a net voice data transmission time is 116 µs. Namely, in this example, the transmission efficiency is about 21%.

If so, the maximum number of simultaneous calls is 22 as represented by the following Equation (2). It is assumed herein that the time length of the beacon is 1 ms.

$$(20 \text{ ms} - 1 \text{ ms})/(277 \text{ µs} + 559 \text{ µs}) = 22.7 \quad (2)$$

In the example of FIG. 8, a frame interval is 80 µs. In comparison with a frame interval of 360 µs in the example of FIG. 6, the frame interval in the example of FIG. 8 is about one-fourth to one-fifth of that in the example of FIG. 6 for the following reason. A random value for collision avoidance in the sequence shown in FIG. 6 is 32 whereas a random value in the sequence shown in FIG. 8 is as small as 4.

Due to this, in the sequence shown in FIG. 8, if it is assumed that two packets are erroneously transmitted when a packet collision occurs because of an equal transmission timing at a probability of about ¼ during a traffic congestion, about one-fourth of all the packets transmitted from the wireless terminals 2 to the wireless LAN base station 1 turn invalid packets. The maximum number of simultaneous calls is 17 in light of presence of these invalid packets.

If a plurality of wireless terminals 2 are equal in transmission timing, the wireless LAN base station 1 receives a plurality of data packets almost simultaneously. In this case, if a reception level difference between the two data packets is within 10 dB, a probability of erroneously receiving these data packets is generally high. If so, one invalid packet occurs.

On the other hand, if the reception level difference between the two data packets at the wireless LAN base station 1 is equal to or greater than 20 dB, a probability of normally receiving the higher reception level packet and not receiving the lower reception level packet is high. If so, no invalid packet occurs.

It is, therefore, considered that the maximum number of simultaneous calls in an actual environment is between 17 and 22.

The Table 1 shows the maximum number of simultaneous calls when a voice is transmitted as a data packet in the wireless LAN according to the present invention. For comparison purposes, the maximum number of simultaneous calls in the ordinary wireless LAN according to the currently most popular IEEE 802.11 Standards is shown in the Table 1, as well.

TABLE 1

| Number of retransmission terminals | Maximum number of simultaneous calls | |
|---|---|---|
| | Standard wireless LAN communication | Communication according to the present invention |
| 0 | 10 | 17 to 22 |
| 1 | 6 | 12 to 17 |
| 2 | 2 | 6 to 11 |

In a VoIP system using the wireless LAN, the maximum number of simultaneous calls decreases due to a retransmission processing in a layer 2. If the wireless terminal 2 is located outside of a transmission range, in particular, the wireless terminal 2 repeatedly retransmits a voice packet up to a preset upper limit number of times, resulting in a great decrease in the maximum number of simultaneous calls. If so, the wireless LAN base station 1 normally repeatedly retransmits the voice packet to this wireless terminal 2 up to a preset upper limit number of times. As a result, the maximum number of simultaneous calls further decreases. In the Table 1, the wireless terminal 2 that is located outside of the transmission range and that repeatedly retransmits the voice packet is referred to as "retransmission terminal", and the maximum number of simultaneous calls corresponding to each number of retransmission terminals is shown. In the Table 1, the upper limit number of times of retransmission of each of the wireless terminal 2 and the wireless LAN base station 1 is 4.

As is obvious from the Table 1, the wireless LAN according to the present invention can improve the maximum number of simultaneous calls twofold to threefold from that of the ordinary wireless LAN system according to the currently most popular IEEE 802.11 Standards.

The advantage of improving the maximum number of simultaneous calls attained by the wireless LAN according to the present invention is more conspicuous if each wireless terminal 2 performs a power saving operation during a call.

Table 2 shows the maximum number of simultaneous calls if each wireless terminal 2 performs the power saving operation during a call in the wireless LAN according to the present invention. For comparison purposes, the maximum number of simultaneous calls if a wireless terminal performs a power saving operation during a call in the ordinary wireless LAN according to the currently most popular IEEE 802.11 Standards is shown in the Table 2, as well.

A comparison of the Table 1 with the Table 2 indicates that the maximum number of simultaneous calls is equal in the wireless LAN according to the present invention whether or not each wireless terminal 2 performs the power saving operation during a call.

In the ordinary wireless LAN according to the currently most popular IEEE 802.11 Standards, by contrast, if each wireless terminal performs the power saving operation during a call, the maximum number of simultaneous calls decreases to about 70%.

TABLE 2

| Number of retransmission terminals | Maximum number of simultaneous calls | |
|---|---|---|
| | Standard wireless LAN communication | Communication according to the present invention |
| 0 | 7 | 17 to 22 |
| 1 | 4 | 12 to 17 |
| 2 | 1 | 6 to 11 |

Figure 9:
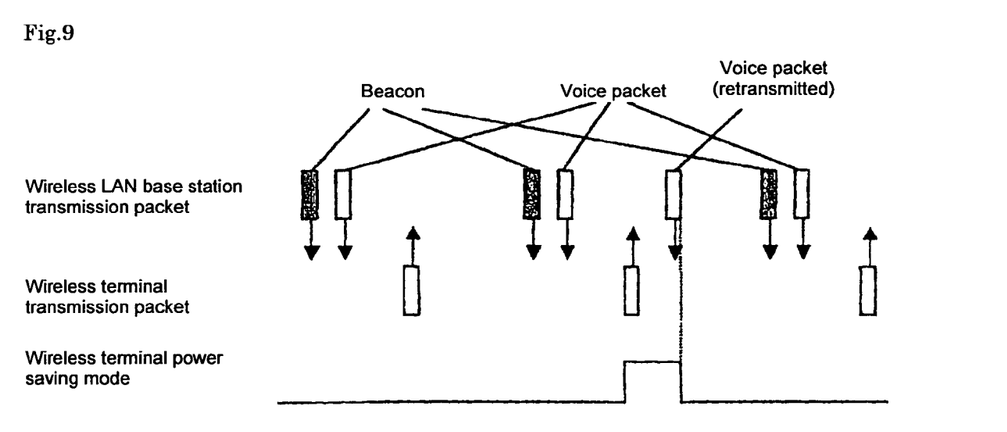
FIG. 9 is a time chart that explains a power saving operation during a call performed by the wireless terminal in the wireless LAN according to the present invention.

FIG. 9 is a time chart that explains the power saving operation during a call performed by the wireless terminal 2 in the wireless LAN according to the present invention. For reference, FIG. 10 is a time chart that explains the power saving operation during a call performed by the wireless terminal 2 in the ordinary wireless LAN system according to IEEE 802.11 Standards.

Referring to FIG. 9, a notification that a mode of the wireless terminal 2 is changed to a power saving mode is transmitted to the wireless LAN base station 1 by a voice packet transmitted from the wireless terminal 2 to the wireless LAN base station 1. Namely, a notification that the mode of the wireless terminal 2 is changed to an active mode is transmitted by a voice packet that does not include a retransmission request. The notification that the mode of the wireless terminal 2 is changed to the power saving mode is transmitted by a voice packet that includes the retransmission request.

As can be seen from FIG. 9, a packet only for the power saving operation is not used in the wireless LAN according to the present invention.

Figure 10:
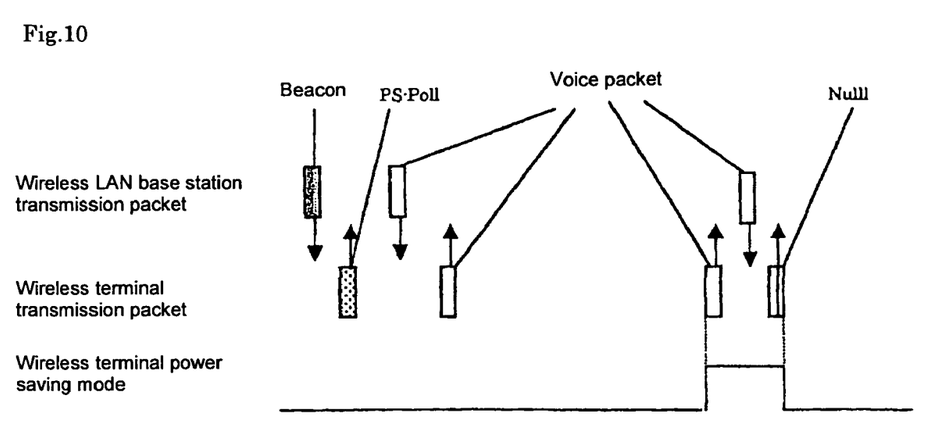
FIG. 10 is a time chart that explains a power saving operation during a call performed by the wireless terminal in an ordinary wireless LAN according to IEEE 802.11 Standards.

Referring to FIG. 10, by contrast, in the ordinary wireless LAN system according to IEEE 802.11 Standards, the wireless terminal needs to transmit a request packet called "PS-Poll" to the wireless LAN base station 1 so as to receive the voice packet, right after a beacon, destined to this wireless terminal from the wireless LAN base station.

Further, the wireless terminal 2 needs to transmit a notification that the mode of the wireless terminal 2 is changed to the active mode using a voice packet destined to the wireless LAN base station 1 so as to receive a voice packet, after reception of the PS-Poll, destined to the wireless terminal 2 from the wireless LAN base station 1. When receiving the notification of the change to the active mode from the wireless terminal 2, the wireless LAN base station 1 transmits the voice packet held in the wireless LAN base station 1 and destined to the wireless terminal 2. After the wireless terminal 2 receives the voice packet, the mode of the wireless terminal 2 is changed to the power saving mode again. The wireless terminal 2, therefore, needs to transmit a notification of the change to the power saving mode to the wireless LAN base station 1 using a layer 2 packet called "Null packet" that does not include a data part.

As can be seen from FIG. 10, if the wireless terminal 2 operates in the power saving mode during a call in the ordinary wireless LAN system according to IEEE 802.11 Standards, the PS-Poll or the Null packet is generated whenever the voice packet is transmitted from the wireless LAN base station 1 to the wireless terminal 2. This results in a decrease in the maximum number of simultaneous calls.

As is obvious from the Table 2, if the wireless terminal 2 performs the power saving operation during a call in the wireless LAN according to the present invention, the maximum number of simultaneous calls in the wireless LAN according to the present invention can be improved threefold to fourfold from that in the ordinary wireless LAN system according to the currently most popular IEEE 802.11 Standards.

As stated so far, the present invention can improve the maximum number of simultaneous calls without degrading the call quality of voice transmission. In addition, the maximum number of simultaneous calls does not decrease even if the wireless terminal performs the power saving operation during a call. The present invention can be applied even to the cellular IP telephone system having strict battery-related requirements.

What is claimed is:

1. A packet transmitting apparatus in a wireless LAN comprising a wireless LAN base station; and a plurality of wireless terminals connected to said wireless LAN base station through the wireless LAN, wherein
    said wireless LAN base station includes:
    frame burst transmission means without an ACK for continuously transmitting a plurality of data packets destined to said plurality of wireless terminals at minimum frame intervals without ACK;
    retransmission processing means for performing a processing for transmitting a data packet to be retransmitted based on retransmission request information included in data packets transmitted from said plurality of wireless terminals;
    notification packet generation means for generating notification packets for notifying said plurality of wireless terminals of frame burst structure information on frame burst packets that are all the data packets continuously transmitted at the minimum frame intervals without the ACK packet between beacons; and
    frame transmission means using ACK for transmitting the data packets to be retransmitted with the notification packets according to retransmission control procedures using a predetermined frame interval and an ACK packet, and
    said each wireless terminal includes:
    retransmission request processing means for generating retransmission request information if an unreceived packet is detected among frame burst packets destined to the wireless terminal and notified by frame burst structure information included in said notification packet transmitted to the wireless terminal;
    retransmission header adding means for transmitting the retransmission request information generated by the retransmission request processing means with a retransmission header accompanied with the data packets destined to the wireless LAN base station; and
    retransmitted packet receiving means for receiving said retransmitted data packet.

2. The packet transmitting apparatus in the wireless LAN according to claim 1, wherein
    said frame burst transmission means without ACK included in said wireless LAN base station includes sequence number allocating means for allocating a sequence number to each of the data packets transmitted using a frame burst,
    said retransmission request processing means included in said each wireless terminal generates the retransmission request information including said sequence number, and
    said retransmission processing means included in said wireless LAN base station performs a retransmission processing while referring to said sequence number included in the retransmission request information accompanied with the data packets transmitted from said wireless terminal.

3. The packet transmitting apparatus in the wireless LAN according to claim 2, wherein
said frame burst transmission means included in said wireless LAN base station transmits only the data packets having a predetermined priority using the frame burst, and transmits the other data packets having priority other than the predetermined priority with ACK and without using the frame burst, and
the retransmission request processing means included in said wireless terminal transmits only the data packets having the predetermined priority while having the retransmission request information added to the data packets, and transmits the other data packets having the priorities other than the predetermined priority without having the retransmission request information added to the data packets.

4. The packet transmitting apparatus in the wireless LAN according to claim 3, wherein
when said wireless terminal transmits the retransmission request information accompanied with the data packets destined to skid wireless LAN base station,
said wireless LAN base station is notified that a power saving mode is changed to an active mode by header information on the transmitted data packet if the accompanied retransmission request information requests to retransmit the data packet received using the frame burst, and
said wireless LAN base station is notified that the power saving mode is changed to a sleep mode by the header information on the transmitted data packet if the accompanied retransmission request information does not request to retransmit the data packet received using the frame burst.

5. The packet transmitting apparatus in the wireless LAN according to claim 4, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

6. The packet transmitting apparatus in the wireless LAN according to claim 3, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

7. The packet transmitting apparatus in the wireless LAN according to claim 2, wherein
when said wireless terminal transmits the retransmission request information accompanied with the data packets destined to said wireless LAN base station,
said wireless LAN base station is notified that a power saving mode is changed to an active mode by header information on the transmitted data packet if the accompanied retransmission request information requests to retransmit the data packet received using the frame burst, and
said wireless LAN base station is notified that the power saving mode is changed to a sleep mode by the header information on the transmitted data packet if the accompanied retransmission request information does not request to retransmit the data packet received using the frame burst.

8. The packet transmitting apparatus in the wireless LAN according to claim 7, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

9. The packet transmitting apparatus in the wireless LAN according to claim 2, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

10. The packet transmitting apparatus in the wireless LAN according to claim 1, wherein
said wireless terminal includes frame burst request packet generation means for requesting said wireless LAN base station in advance to transmit the data packets destined to the wireless terminal using a frame burst,
said wireless LAN base station includes a frame burst response packet generation means for notifying said wireless terminal whether the frame burst is applied to transmission of the data packets destined to the wireless terminal if the wireless LAN base station receives said frame burst request packet,
said frame burst transmission means included in said wireless LAN base station transmits only the data packets destined to said wireless terminal using the frame burst for which it is notified that the frame burst is applied, and transmits the other data packets destined to said wireless terminal with ACK and without using the frame burst, and
the retransmission request processing means included in said wireless terminal transmits the retransmission request information accompanied with the data packets only when said wireless terminal receives the frame burst response packet that notifies the wireless terminal that the frame burst is applied to the transmission of the data packets destined to the wireless terminal, and transmits the data packets without adding the retransmission request information when receiving the frame burst response packet that notifies the wireless terminal that the frame burst is not applied.

11. The packet transmitting apparatus in the wireless LAN according to claim 10, wherein
said frame burst transmission means included in said wireless LAN base station transmits only the data packets having a predetermined priority using the frame burst, and transmits the other data packets having priority other than the predetermined priority with ACK and without using the frame burst, and
the retransmission request processing means included in said wireless terminal transmits only the data packets having the predetermined priority while having the retransmission request information added to the data packets, and transmits the other data packets having the priorities other than the predetermined priority without having the retransmission request information added to the data packets.

12. The packet transmitting apparatus in the wireless LAN according to claim 11, wherein
when said wireless terminal transmits the retransmission request information accompanied with the data packets destined to said wireless LAN base station,
said wireless LAN base station is notified that a power saving mode is changed to an active mode by header information on the transmitted data packet if the accompanied retransmission request information requests to retransmit the data packet received using the frame burst, and said wireless LAN base station is notified that the power saving mode is changed to a sleep mode by the header information on the transmitted data packet if the accompanied retransmission request information does not request to retransmit the data packet received using the frame burst.

13. The packet transmitting apparatus in the wireless LAN according to claim 12, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

14. The packet transmitting apparatus in the wireless LAN according to claim 11, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

15. The packet transmitting apparatus in the wireless LAN according to claim 10, wherein when said wireless terminal transmits the retransmission request information accompanied with the data packets destined to said wireless LAN base station, said wireless LAN base station is notified that a power saving mode is changed to an active mode by header information on the transmitted data packet if the accompanied retransmission request information requests to retransmit the data packet received using the frame burst, and said wireless LAN base station is notified that the power saving mode is changed to a sleep mode by the header information on the transmitted data packet if the accompanied retransmission request information does not request to retransmit the data packet received using the frame burst.

16. The packet transmitting apparatus in the wireless LAN according to claim 15, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

17. The packet transmitting apparatus in the wireless LAN according to claim 10, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

18. The packet transmitting apparatus in the wireless LAN according to claim 1, wherein said frame burst transmission means included in said wireless LAN base station transmits only the data packets having a predetermined priority using the frame burst, and transmits the other data packets having priority other than the predetermined priority with ACK and without using the frame burst, and the retransmission request processing means included in said wireless terminal transmits only the data packets having the predetermined priority while having the retransmission request information added to the data packets, and transmits the other data packets having the priorities other than the predetermined priority without having the retransmission request information added to the data packets.

19. The packet transmitting apparatus in the wireless LAN according to claim 18, wherein when said wireless terminal transmits the retransmission request information accompanied with the data packets destined to said wireless LAN base station, said wireless LAN base station is notified that a power saving mode is changed to an active mode by header information on the transmitted data packet if the accompanied retransmission request information requests to retransmit the data packet received using the frame burst, and said wireless LAN base station is notified that the power saving mode is changed to a sleep mode by the header information on the transmitted data packet if the accompanied retransmission request information does not request to retransmit the data packet received using the frame burst.

20. The packet transmitting apparatus in the wireless LAN according to claim 19, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

21. The packet transmitting apparatus in the wireless LAN according to claim 18, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

22. The packet transmitting apparatus in the wireless LAN according to claim 1, wherein when said wireless terminal transmits the retransmission request information accompanied with the data packets destined to said wireless LAN base station, said wireless LAN base station is notified that a power saving mode is changed to an active mode by header information on the transmitted data packet if the accompanied retransmission request information requests to retransmit the data packet received using the frame burst, and said wireless LAN base station is notified that the power saving mode is changed to a sleep mode by the header information on the transmitted data packet if the accompanied retransmission request information does not request to retransmit the data packet received using the frame burst.

23. The packet transmitting apparatus in the wireless LAN according to claim 22, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

24. The packet transmitting apparatus in the wireless LAN according to claim 1, having frame burst transmission means for transmitting a plurality of data packets respectively corresponding to said plurality of wireless terminals as a single sequence in the signal form of the frame burst packet without ACK and in the signal form of multicast from the wireless LAN base station to said plurality of wireless terminals.

25. A wireless LAN base station apparatus comprising:

frame burst transmission means without ACK for continuously transmitting a plurality of data packets destined to a plurality of wireless terminals without using ACK;

retransmission processing means for performing a processing for transmitting a data packet to be retransmitted based on retransmission request information included in data packets transmitted from said plurality of wireless terminals;

notification packet generation means for generating notification packets for notifying said plurality of wireless terminals of frame burst structure information on frame burst packets that are all the data packets continuously transmitted at the minimum frame intervals without using an ACK packet between beacons; and frame transmission means with ACK for transmitting the data packets to be retransmitted with the notification packets according to retransmission control procedures using a predetermined frame interval and an ACK packet.

* * * * *